US012692080B2

(12) United States Patent
Glemba et al.

(10) Patent No.: US 12,692,080 B2
(45) Date of Patent: Jul. 28, 2026

(54) CONVEYOR ARRANGEMENT

(71) Applicant: INTERROLL HOLDING AG, Sant'Antonino (CH)

(72) Inventors: Lidiia Glemba, Hückelhoven (DE); Thomas Eisinger, Hückelhoven (DE); Fabian Purpus, Hückelhoven (DE); Florian Funk, Hückelhoven (DE); Jens Friedrichs, Hückelhoven (DE)

(73) Assignee: Interroll Holding AG, Sant'Antonino (CH)

( * ) Notice: Subject to any disclaimer, the term of this patent is extended or adjusted under 35 U.S.C. 154(b) by 129 days.

(21) Appl. No.: 18/550,109

(22) PCT Filed: Mar. 14, 2022

(86) PCT No.: PCT/EP2022/056449
§ 371 (c)(1),
(2) Date: Sep. 11, 2023

(87) PCT Pub. No.: WO2022/194736
PCT Pub. Date: Sep. 22, 2022

(65) Prior Publication Data
US 2024/0182246 A1      Jun. 6, 2024

(30) Foreign Application Priority Data

Mar. 15, 2021     (DE) ..................... 10 2021 106 255.1

(51) Int. Cl.
*B65G 15/28* (2006.01)
*B65G 23/26* (2006.01)
*B65G 47/57* (2006.01)

(52) U.S. Cl.
CPC ............. *B65G 15/28* (2013.01); *B65G 23/26* (2013.01); *B65G 47/57* (2013.01); *B65G 2207/40* (2013.01); *B65G 2811/095* (2013.01)

(58) Field of Classification Search
None
See application file for complete search history.

(56) References Cited

U.S. PATENT DOCUMENTS 4,223,775 A  *  9/1980  Lloyd ..................... B65G 23/26
477/172
5,655,667 A  *  8/1997  Isaacs ..................... B65G 47/31
198/572

(Continued)

FOREIGN PATENT DOCUMENTS

CN       108001934 A      5/2018
DE         2627511 A      2/1977

(Continued)

OTHER PUBLICATIONS

Office Action for German Application No. 10 2021 106 255.1.
PCT International Search Report for PCT/EP2022/056449.
PCT Written Opinion for PCT/EP2022/056449.

*Primary Examiner* — Kavel Singh
(74) *Attorney, Agent, or Firm* — Biotech Beach Law PC; Raymond Wagenknecht

(57) ABSTRACT

Conveyor arrangement, adapted for taking over a conveyed object, in particular a postal parcel, at a takeover area, in particular from an upstream feed device, for transferring the conveyed object at a transfer area, in particular to a terminal; for transferring the conveyed object in a chute area from the takeover area to the transfer area, wherein the chute region comprises at least one chute which is inclined downwardly in the conveying direction and on which the conveyed object is conveyed in a gravitationally sliding manner, wherein the chute region comprises a belt conveyor with a conveyor belt, characterized in that the belt conveyor has a holding brake which is adapted to hold the conveyor belt in a stop position.

13 Claims, 2 Drawing Sheets

(56) References Cited

U.S. PATENT DOCUMENTS

| | | | | |
|---|---|---|---|---|
| 6,070,709 | A * | 6/2000 | Morchen | B65G 1/08 |
| | | | | 193/4 |
| 6,244,424 | B1 * | 6/2001 | Reusser | B65G 11/203 |
| | | | | 198/560 |
| 6,640,953 | B2 * | 11/2003 | Brouwer | B65G 47/261 |
| | | | | 193/35 G |
| 9,278,809 | B2 * | 3/2016 | Lykkegaard | B65G 47/26 |
| 9,987,755 | B2 * | 6/2018 | Prahlad | B65G 13/075 |
| 10,336,545 | B2 * | 7/2019 | Schitthelm | B65G 11/081 |
| 10,947,056 | B2 * | 3/2021 | Hartmann | B65G 11/203 |
| 11,401,120 | B2 * | 8/2022 | Hartmann | B65G 65/23 |
| 11,878,876 | B2 * | 1/2024 | Fenile | B65G 47/40 |
| 2018/0079606 | A1 * | 3/2018 | Dwivedi | B65G 47/26 |

FOREIGN PATENT DOCUMENTS

| | | | | | |
|---|---|---|---|---|---|
| DE | 19724194 | A1 | 12/1998 | | |
| DE | 10 2010 005 267 | A1 | 7/2011 | | |
| DE | 10 2013 111 788 | A1 | 4/2015 | | |
| DE | 102013111788 | B4 * | 8/2021 | | B65G 57/112 |
| EP | 0 706 960 | B1 | 3/2000 | | |
| EP | 1 868 923 | B1 | 5/2010 | | |
| EP | 2 922 775 | B1 | 9/2016 | | |
| WO | 03/043428 | A2 | 5/2003 | | |
| WO | 2019/002048 | A1 | 1/2019 | | |
| WO | 2019/016591 | A1 | 1/2019 | | |

* cited by examiner

CONVEYOR ARRANGEMENT

FIELD OF THE INVENTION

The invention relates to a conveyor arrangement.

BACKGROUND OF THE INVENTION

At terminals in a parcel distribution center, parcels are loaded into delivery trucks that are assigned to specific destination regions. By a sorter, for example a crossbelt sorter (e.g. WO 2019/002 048 A1), the parcels are fed to the individual terminals sorted at high output speed. To overcome height differences, inclined chutes are used between the sorter and the terminal, in which the parcels slide along due to gravity. Due to the high speeds of the parcels, damage to the parcels can occur. In addition, there are often parcel jams in the chutes, which are dissolved manually.

EP 1 868 923 B1 discloses a terminal chute. At least two driven rollers arranged transverse to the conveying direction of the chute are provided. The rollers are driven at different speeds. The speed of one roller is selected to be higher than that of the other roller, the closer the respective roller is to the exit side of the terminal chute.

EP 0 706 960 B1 discloses a terminal in front of which a timing belt is arranged, to which the objects to be conveyed are delivered in a timed manner. The objects to be conveyed can thus be conveyed gently one after the other.

DE 10 2010 005 267 A1 discloses a conveying device for piece goods with a conveyor head that has a receiving area for manually placing piece goods. The conveyor head can be displaced in the area.

EP 2 922 775 B1 discloses a brake roller based on magnetic eddy current. This brake can brake a conveyed object, but cannot hold it at a standstill.

BRIEF SUMMARY OF THE INVENTION

It is the object of the present invention to provide an improved conveyor arrangement and use of a conveyor arrangement.

The conveyor arrangement is characterized by the fact that the conveyed goods arrive at the transfer area at low speed and thus the risk of damage is reduced. Nevertheless, safe access to upper areas of the chute section is safely possible for a person to repair any defects. In this case, an overhead sorter can continue to be operated, since access is from the side of the terminal.

The invention is particularly suitable for conveying postal packages as conveyed goods and/or for conveying polybags as conveyed goods. Polybags are film-packed conveyed goods without a rigid outer contour.

A conveyed object suitable for use, in particular a postal parcel, has a weight of 20 kg, which does not preclude the use of lighter and heavier packages. In particular, the conveying arrangement is set up to convey a conveyed item, especially a postal parcel, of 50 kg. In addition, it may also be possible to convey so-called polybags, i.e. conveyed items that are packaged in a film, such as items of clothing. The sliding bed is designed to support a point weight load of at least. 100 kg.

BRIEF DESCRIPTION OF THE DRAWINGS

The invention is explained in more detail below with reference to the figures; herein shows.

DETAILED DESCRIPTION OF PREFERRED EMBODIMENTS

Figure 1:
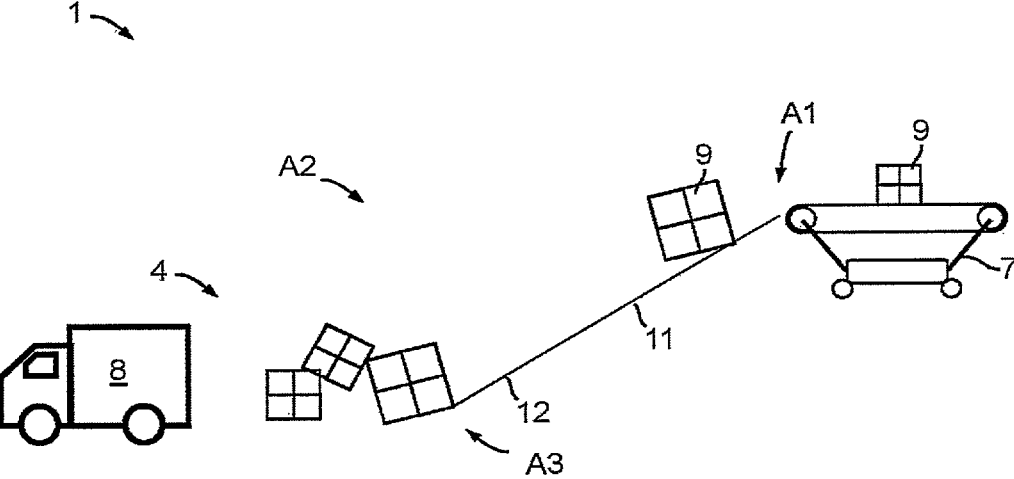
FIG. 1 is a schematic side view of the structure of a conveyor arrangement.

FIG. 1 shows a conveyor arrangement 1 according to the invention. A conveyed object 9, for example a mail package, is transported by a sorter 7. From the sorter 7, the conveyed object reaches a takeover area A1, which is followed by a chute area A2. In the chute area, the conveyed object 9 slides downward, at least in sections, to reach a terminal 4 at a transfer area A3. At the terminal 4, the conveyed object is stored at least briefly in order to be transferred from there to a delivery van 8, a roll container or a skeleton box.

Figure 2:
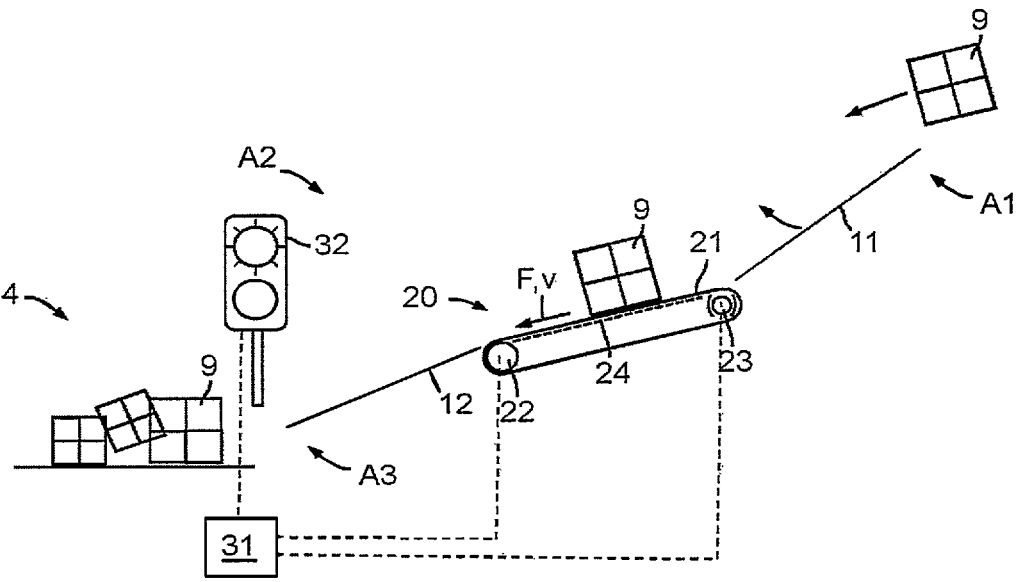
FIG. 2 is a schematic side view of the conveyor arrangement in conveying mode.

FIG. 2 shows details of chute area A2 with two separate chutes 11, 12, which are arranged one behind the other in conveying direction F. At chute area A2, very large height differences are overcome in some cases. Due to space optimization, chute area A2 is therefore very steep, which leads to a large acceleration of the conveyed object 9. In addition, the conveyed object is provided by the sorter 7 at a speed of up to 3 m/s. This could cause damage to the conveyed object. This could lead to damage to the conveyed object, in particular when it hits in the terminal 4. In order to prevent the conveyed object 9 from being damaged by the resulting high speed, a belt conveyor is arranged downstream of the first chute 11 in the conveying direction F.

The belt conveyor 20 has a conveyor belt 21 on which the conveyed object is conveyed at least in sections in the chute area A2. The belt conveyor 20 has a conveyor belt 21 on which the conveyed object 9 comes to rest. The conveyor belt 21 is tensioned around two deflection rollers 26. In a conveying operating state, the conveyor belt 21 is operated at a conveying speed which is, in particular, less than 1.5 m/s and, in particular, is approximately between 0.2 and 0.5 m/s. A belt drive 22, for example a drum motor, is provided for driving the conveyor belt 21.

An object 9 impinging the conveyor belt 21 is braked by the conveyor belt 21 if the speed of the object 9 is too high. At the same time, it is ensured that the conveyed object 9 continues to be conveyed at least at the conveying speed. A static braking device possible as an alternative would always have the disadvantage that the conveyed object is completely stopped. The belt conveyor can thus ensure that the conveyed object 9 has the defined conveying speed (incl. a tolerance band) at the end of the belt conveyor.

A second chute 12 can optionally be connected to the belt conveyor 20, via which the conveyed object 9 finally continues from the belt conveyor 20 to the terminal 4. The inclination of the second chute 12 can be less than the inclination of the first chute 11. It is possible that one or more further belt conveyors are connected to the second chute.

Figure 3:
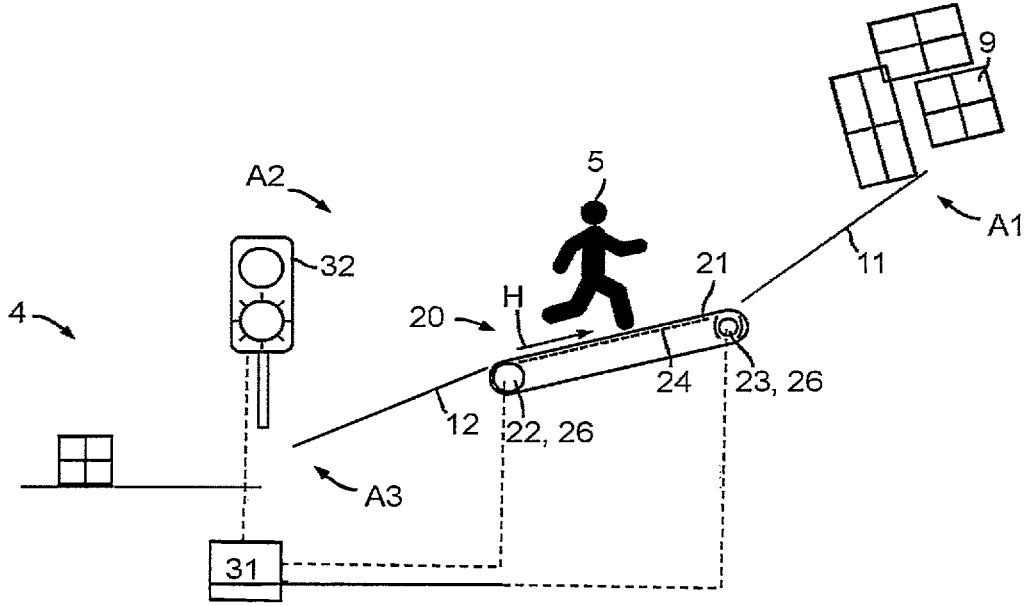
FIG. 3 is a schematic side view of the conveyor arrangement according to FIG. 2 in maintenance mode.

FIG. 3 shows that the chute area A2 is limited in width (direction into the image plane) due to the space optimization. If a very large object 9 enters the chute area A2, jams may occur that cannot be dissolved automatically. Jams often occur at the takeover area A1. To dissolve such jams, a person 5 climbs from the terminal 4 in the direction of the takeover area A1. To prevent the jammed parcels from falling onto the person, this person can also dissolves them from the neighboring chute.

Access from the other direction (from sorter 7) is generally not possible, since sorter 7 will continue to operate if individual terminals become inoperable. To allow entry to chute area A2, the following arrangements are preferred:

The belt conveyor 20 has a sliding bed 24 for the conveyor belt 21. The sliding bed 24 has a load-bearing capacity of at least 100 kg so that the person can safely enter the chute area A2 from the terminal 4 in the direction of the takeover area A1.

The belt conveyor 20 includes a holding brake 23. The holding brake 23 is set up to hold the conveyor belt 21 at a standstill in a maintenance operating state, even in the event that the person steps onto the belt conveyor 20. Taking into account the weight of the person, a minimum holding force H required for this purpose can be determined by considering the inclination. At an angle of inclination of 20° (not shown), this results in a minimum holding force H of about 300N for the conveyor belt 21, which is to be provided by the belt conveyor 20.

A control unit 31 is provided to control the belt conveyor 20 and, in particular, to issue control commands to the belt drive and the holding brake 23. An output device 32, for example a traffic light, is provided to indicate to the person that the person 5 can enter the chute area A2.

Figure 4:
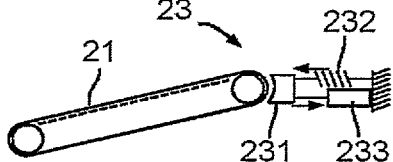
FIG. 4 is a principle representation of an embodiment of a band brake.

FIG. 4 shows an example of the operation of the holding brake 23 in one embodiment. A braking element 231 is provided, which can apply a braking force at least indirectly to the conveyor belt 21 via a frictional connection. A force storage 232, for example a spring, provides the braking force for the braking element 231. A release actuator 233 is provided to counteract the force accumulator in the conveying operating condition, thereby keeping the holding brake 23 inactive. To initiate the maintenance operating condition, the release actuator 233 is de-energized (this can also be done unintentionally by a power failure). The counterforce to the force storage 232 is removed and the holding brake 23 holds the conveyor belt in place. The braking element 231 can be arranged outside or inside the deflection roller 26.

Figure 5:
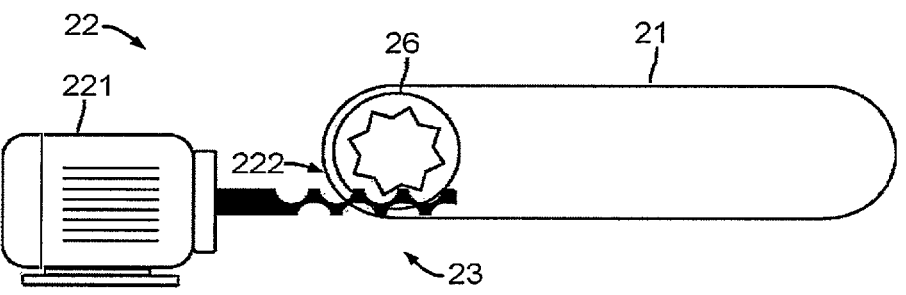
FIG. 5 is a schematic diagram of a further design of a band brake.

FIG. 5 shows the operation of the holding brake 23 in one embodiment. The belt drive 22 includes a drive motor 221 that is drivingly connected to the deflection roller 26 via a self-locking gear 222. The self-locking gear 222 may be a worm gear. The belt drive 22 also provides the holding brake 23. The self-locking gear 222 prevents a reversal of the drive direction.

LIST OF REFERENCE SIGNS

1 conveyor arrangement
4 terminal
5 person
7 sorter, feed in device
8 delivery van
9 conveyed object (postal parcel)
11 first chute
12 second chute
20 belt conveyor
21 conveyor belt
22 belt drive
221 drive motor
222 gear
23 holding brake
231 braking element

232 force storage
233 release actuator
24 sliding bed
26 deflection roller
31 electronic control
32 output device
A1 takeover area
A2 slide area
A3 transfer area
F conveying direction
H holding force
v conveying speed

What is claimed is:

1. A conveyor arrangement (1), adapted
   for taking over a conveyed object (9), in particular a postal parcel (9), at a takeover area (A1), in particular from an upstream feed device (7),
   for transferring the conveyed object (9) at a transfer area (A3), in particular to a terminal (4);
   for transferring the conveyed object (9) in a chute area (A2) from the takeover area (A1) to the transfer area (A3),
   wherein the chute region (A2) comprises at least one chute (11, 12) which is inclined downwardly in the conveying direction (F) and on which the conveyed object (9) is conveyed in a gravitationally sliding manner,
   wherein the chute region (A2) comprises a belt conveyor (20) with a conveyor belt (21),
   characterized in
   that the belt conveyor (20) has a holding brake (23) which is adapted to hold the conveyor belt (21) in a stop position, and the holding brake (23) is automatically activated when the belt conveyor (20) is de-energized, wherein the holding brake (23) is maintained in an inactive state by a release actuator (233) that counteracts a braking force so that when the belt conveyor (20) is de-energized, the release actuator (233) releases the braking force, thereby automatically activating the holding brake (23).

2. The conveyor arrangement (1) according to claim 1, wherein the belt conveyor (20) is arranged to decelerate the conveyed object (9).

3. The conveyor arrangement (1) according to claim 1, wherein the belt conveyor (20) is arranged behind the chute (11) or behind one of the chutes (11, 12) in the conveying direction (F).

4. The conveyor arrangement (1) according to claim 1, wherein the belt conveyor (20) adapted to
   drive the conveyor belt (21) at a defined conveying speed (v) in a conveying operating state; and
   hold the conveyor belt (21) in a stop position in a maintenance operating state.

5. The conveyor arrangement (1) according to claim 1, wherein the belt conveyor (20) is automatically transferred into the maintenance operating state after de-energizing the belt conveyor (20).

6. The conveyor arrangement (1) according to claim 1, further comprising an output device (32) which is arranged to indicate to a person (5) a state of the holding brake (23), in particular whether the holding brake (23) is activated and/or whether the conveyor arrangement is in the maintenance operating state.

7. The conveyor arrangement (1) according to claim 1, further comprising a feed in device (7) and/or a terminal (4).

8. The conveyor arrangement (1) according to claim 7, wherein the feed in device (7) is a sorter, wherein the sorter (7) is arranged to convey a plurality of conveyed goods along the takeover area (A1), wherein the sorter (7) is arranged that individual ones of the conveyed objects (9) are conveyed past the input area (A1) without being impinged upon in the input area (A1), and wherein the sorter (7) is arranged that individual ones of the conveyed objects (9) are conveyed along the input area (A1) and are thereby selectively impinged upon in the input area (A1).

9. Use of a conveyor arrangement (1) according to claim 1, wherein:

in order to rectify a defect in or upstream of the chute region (A2), the conveyor arrangement (1) is transferred into a maintenance operating state in which the holding brake (23) is activated, a person (5) then moves to the location of the defect via the belt conveyor (20) in order to rectify the defect manually, and after rectification of the defect, the holding brake (23) is released.

10. The use of a conveyor arrangement (1) according to claim 1, wherein the state of the holding brake (23) is indicated to the person (5) by an output device (32).

11. The use of a conveyor arrangement (1) according to claim 9, wherein the state of the holding brake is controlled by an electronic control (31).

12. The use of a conveyor arrangement (1) according to claim 9, wherein a feed in device (7), in particular a sorter (7), arranged above the chute area (A2) in the conveying direction (F) continues to be operated while the defect is dissolved and/or when the conveyor arrangement (1) is in the maintenance operating state and/or when the holding brake (23) is activated.

13. The conveyor arrangement (1) according to claim 1, wherein the holding brake (23) is spring-loaded.

\* \* \* \* \*